US007424000B2

(12) United States Patent
Sekhar

(10) Patent No.: US 7,424,000 B2
(45) Date of Patent: Sep. 9, 2008

(54) TIME SLOT RESERVATION SCHEME IN WIRELESS MESHED NETWORKS

(75) Inventor: Ramesh Sekhar, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 311 days.

(21) Appl. No.: 11/138,799

(22) Filed: May 26, 2005

(65) Prior Publication Data

US 2006/0268771 A1 Nov. 30, 2006

(51) Int. Cl.
*H04J 3/22* (2006.01)

(52) U.S. Cl. ....................... 370/338; 370/469; 370/464; 714/749; 714/755

(58) Field of Classification Search ................. 370/315, 370/338, 339, 433, 466, 467, 468, 469, 329, 370/68, 442; 455/411, 450; 709/225; 714/1-57, 714/699, 747, 749, 751, 752, 755, 758, 776, 714/779; 375/240.12, 240.26, 240.27
See application file for complete search history.

(56) References Cited

U.S. PATENT DOCUMENTS 6,115,390 A * 9/2000 Chuah ........................ 370/443
7,352,712 B2 * 4/2008 Edwards et al. ............. 370/310
2002/0114303 A1 * 8/2002 Crosbie et al. .............. 370/338
2003/0087629 A1 * 5/2003 Juitt et al. ................... 455/411
2003/0115328 A1 * 6/2003 Salminen et al. ............ 709/225
2004/0203815 A1 * 10/2004 Shoemake et al. .......... 455/450
2005/0078636 A1 * 4/2005 Zhang et al. ................ 370/331
2005/0237962 A1 * 10/2005 Upp et al. ................... 370/313

FOREIGN PATENT DOCUMENTS

EP 1134935 9/2001

OTHER PUBLICATIONS

Calhoun et al., "Light Weight Access Point Protocol (LWAPP); draft-ohara-capwap-lwapp-02.text;" IETF Standard-Working-Draft, Internet Engineering Task Force, No. 2, Mar. 31, 2005, pp. 1-11.
Mase et al., "Wireless LAN with Wireless Multihop Backbone Network (WMLAN)," Proceedings of the International Conference on Wireless LANs and Home Networks 5-7, Dec. 7, 2001, pp. 349-358.

(Continued)

*Primary Examiner*—William Trost
*Assistant Examiner*—James D Ewart
(74) *Attorney, Agent, or Firm*—Fay Kaplun & Marcin, LLP

(57) ABSTRACT

A communication system comprises a wireless switch, a plurality of wired access ports and a plurality of wireless access ports. The plurality of wired access ports are coupled to the wireless switch via a wired connection and are configured to receive data over the wired connection and over a wireless connection. The plurality of wireless access ports are configured to receive data over the wireless connection from the wireless access port and to send data over the wireless connection to the wired access port. The wireless access ports are further configured to receive and encapsulate first wireless data packets in to first wired data packets based on a wired transmission protocol and encapsulate the first wired data packets into second wireless data packets based on a wireless transmission protocol.

18 Claims, 5 Drawing Sheets

OTHER PUBLICATIONS

Owada et al., "A Study on Protocol, Implementation and Throughput Evaluation for Multihop Wireless LAN," IEEE, vol. 3 of 4, Apr. 22, 2003, pp. 1773-1777.

Wei et al., "WWAN/WLAN Two-Hop-Relay Architecture for Capacity Enhancement," IEEE, vol. 1, Mar. 21, 2004, pp. 225-230.

* cited by examiner

TIME SLOT RESERVATION SCHEME IN WIRELESS MESHED NETWORKS

TECHNICAL FIELD OF THE INVENTION

This invention relates to wireless networking. More specifically, the present invention relates to a wireless network that comprises a plurality of wireless access ports and wireless switches.

BACKGROUND OF THE INVENTION

In today's work environment, mobile connectivity is becoming increasingly important. The ability to send and receive data anywhere within an office, school, factory or other location is quickly becoming a necessity, and wireless local area networks have been introduced to facilitate such mobile connectivity. Generally, a wireless local area network access points (AP) are directly connected to wired networks, such as an Ethernet network. In this approach, the maintenance of configuration data, the client authentication, and other tasks are conducted on the access point. However, this approach has numerous deficiencies and drawbacks, among others elevated network management and maintenance costs.

To alleviate some of these deficiencies and drawbacks, intelligent wireless networks have been developed. In this type of wireless network, the access ports are coupled to a wireless switch that contains the intelligence elements to maintain configuration data, perform client authentication, and perform other tasks while the access ports provide only wireless access. This configuration presents numerous benefits, among others ease of management, and cost efficiency and flexibility.

Regardless of the wireless network configuration, adequate wireless coverage for a given area is typically confirmed during installation. The confirmation of adequate coverage generally involves a survey of the area that the wireless network is designed to support. However, these surveys can be costly and time consuming. Additionally, the surveys can be inaccurate, leading to areas of poor or no coverage.

Therefore, it is desirable to provide a wireless network system with wireless access ports that substantially eliminate or totally eliminate the need for a prior installation survey. Furthermore, other desirable factors and characteristics of the present invention will become apparent from the subsequent detailed description and the appended claims, taken in conjunction with the accompanying drawings and the for given technical field and background.

BRIEF DESCRIPTION OF THE DRAWINGS

The present invention will hereinafter be described in conjunction with the following drawing figures, wherein like numerals denote like elements, and.

SUMMARY OF THE INVENTION

Figure 1:
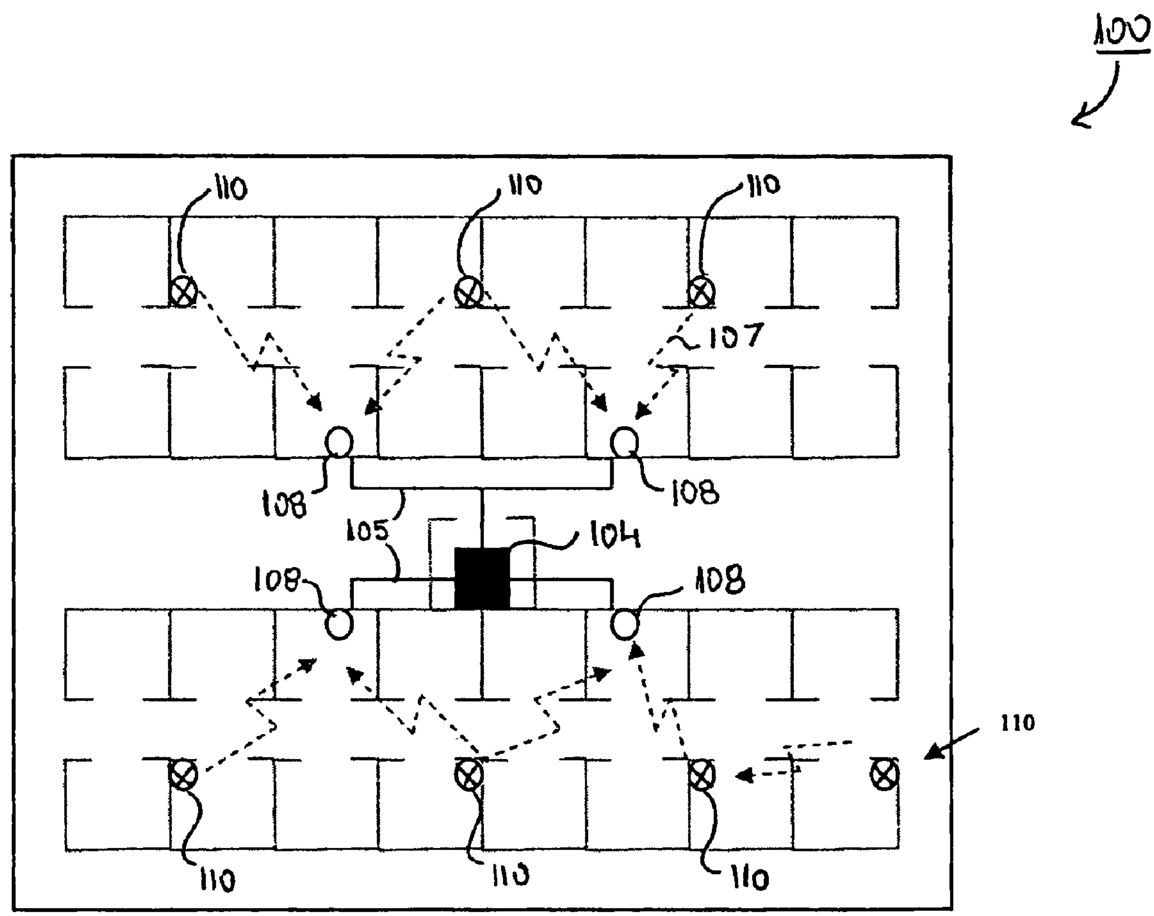
FIG. 1 illustrates an exemplary wireless network in accordance with an exemplary embodiment of the present invention.

A communication system is provided in accordance with an exemplary embodiment of the present invention. The communication system comprises a wireless switch, a plurality of wired access ports and a plurality of wireless access ports. The plurality of wired access ports are coupled to the wireless switch via a wired connection and are configured to receive data over the wired connection and over a wireless connection. The plurality of wireless access ports are configured to receive data over the wireless connection from the wireless access port and to send data over the wireless connection to the wired access port. The wireless access ports are further configured to receive and encapsulate first wireless data packets into first wired data packets based on a wired transmission protocol and encapsulate the first wired data packets into second wireless data packets based on a wireless transmission protocol.

In another exemplary embodiment, an access port for use in a wireless local area network is disclosed. The access port includes an antenna coupled to a wireless receiver and a wireless transmitter. The wireless receiver is configured to receive data packets sent over a wireless link and the wireless transmitter is configured to transmit data packets over the wireless connection. The access port further comprises a processor coupled to the wireless receiver and wireless transmitter, wherein the processor is configured to: encapsulate a first wireless data packet received by the wireless receiver into a first wired data packet using a wired data protocol, and encapsulate the first wireless data packet into a second wireless data protocol for transmission over the wireless link.

In yet another exemplary embodiment of the present invention, a method for transmitting wirelesly data packets to a wireless switch is disclosed. In a first step, a first wireless data packet is received. Then, a first wired data packet is formed by encapsulating the first wireless data packet. Next, a second wireless data packet is formed by encapsulating the first wired data packet. The second wireless data packet is used for transmission between a wireless access port and a wired access port.

In yet another exemplary embodiment of the present invention a time slot reservation scheme is implemented across the wireless APs. A wireless switch divides the time for each AP depending on the number of neighbors each AP has. The time is divided in a number of unequal slots, time slots being allocated for broadcasts, for each wireless AP for inter AP communication, and for local BSS traffic or per antenna setting.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

FIG. 1 illustrates an exemplary wireless local area network 100 distributed in any facility or location. Non-limiting examples of locations are the floor of an office building, hospital, retail center, etc. A wireless switch 104 is provided as part of the wireless local area network 100 and wired access ports 108 are coupled to the wireless switch 104. FIG. 1 also illustrates wireless access ports 110, which are configured to communicate with the wired access ports 108 through wireless links 102 using known protocols such as 802.11a/b/g or 802.16. The network 100 includes mobile units 114 that can communicate between each other as well as with other devices in the local area network 100 and with devices outside the local area network.

Wireless switch 104 is configured to provide centralized management and intelligence for the wireless local area network 100. The wireless switch 104 can not directly send or receive data packets from mobile units 114 or wireless access ports 110; it can only receive data directly from the wired access ports 108. The wireless switch 104 can be configured to couple the wireless local area network 100 to another network, such as the Internet.

In addition to providing centralized management and intelligence for the wireless local area network 100, the wireless switch 104 is also configured to distribute software to the wired access ports 108. Additionally, any software updates can be provided to the wireless switch 104. The wireless switch 104 can then distribute the software updates to the wired access ports 108. As it will be discussed in greater detail further in this document, the wireless access ports 110 can receive initial software and updated software from one of the wired access ports 108.

The software distribution is preferably conducted upon initialization of the wired access port 108. However, other events or combination of events for the wired access ports 108 or other equipment can initiate the software distribution by wireless switch 104. Additionally, software updates can be provided to wireless switch 104 and the wireless switch 104 can distribute the software updates to the wired access ports 108. The wired access ports 108 can provide initial software and any updates from one of the wired access ports 108, as will be discussed in greater detail below.

Wired access ports 108 connect to the wireless switch 104 via a wired connection 105. In one exemplary embodiment, the wired connection 105 can provide data transfer between the wired access ports 108 and the wireless switch 104 using an Ethernet protocol. Additionally, the wired connection 105 can also supply power to the wired access ports 108.

Wired access port 108 can receive data packets from the mobile units 114 and send the data packets to the wireless switch 104 and vice versa. In one exemplary embodiment, the mobile units 114 send data packets using the 802.11 protocol. The wired access port 108 can receive the 802.11 data packets, encapsulate the data packets to form new data packets based on a protocol suitable for transfer over a wired connection (e.g. 802.3 data packets or proprietary data packets) and send the data packets to the wireless switch 104 over the Ethernet connection.

Wireless access ports 110 are configured to communicate with mobile units 114. Unlike the wired access ports 108, the wireless access ports 110 are not connected to the wireless switch 104 via the wired connection 105. Instead, the wireless access ports 110 are configured to send data to wired access ports 108 via a wireless link 107, and the wired access ports 108 send that data to the wireless switch 104. In one embodiment, wireless access ports 110 can be placed anywhere that is near an accessible power supply, such as a power outlet. Alternatively, wireless access port 110 can have an on board power system(s).

Figure 2:
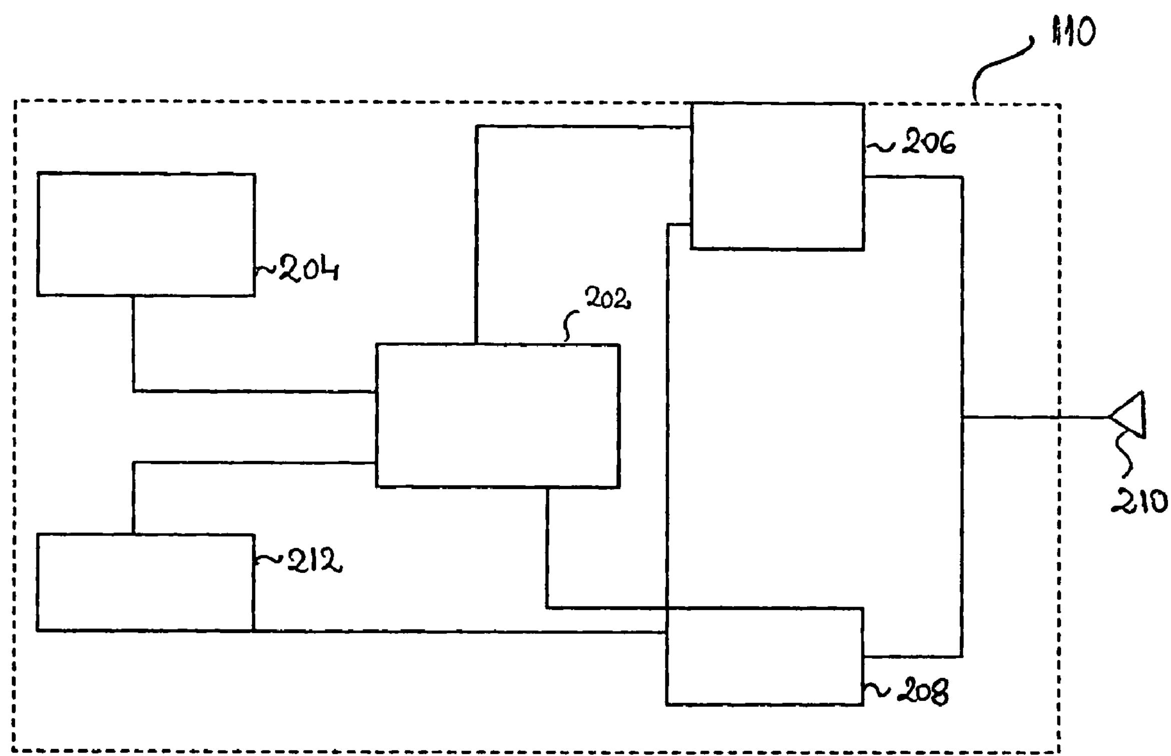
FIG. 2 illustrates a wireless access port implemented in accordance with an exemplary embodiment of the present invention.

An exemplary wireless access port 110 is illustrated in FIG. 2. Wireless access port 110 comprises a processor 202 coupled to a memory 204. A transmitter 208 and a receiver 206 are coupled to the processor 202 and an antenna 210. Power to the components is supplied via a power supply 212.

Processor 202 is configured to execute the various programs needed for the operation of the wireless access port 110. Processor 202 can store and retrieve data from memory 204, including an initialization boot power program that executes upon initial powering of the wireless access port 110. Also, an image file comprising software code downloaded from the wired access port 108 to the wireless access port 110 can be saved in the memory 204.

Receiver 206 is configured to receive transmissions from other wireless access ports 110, wired access ports 108, and mobile units 114. Transmitter 208 transmits data packets to the mobile units 114, wired access ports 108 and other wireless access ports 110. The wireless access ports 110 are directly connected to the wireless switch 104. Therefore, the transmitter 208 transmits data to one of the wired access ports 108, which will then send the data to the wireless switch 104. In one exemplary embodiment, receiver 206 and transmitter 208 can be provided as a single unit.

Antenna 210 receives and transmits signals. In one exemplary embodiment, antenna 210 is a single antenna coupled to both the receiver 206 and the transmitter 208. Alternatively, a separate antenna can be provided for the receiver 206 and the transmitter 208 or the transmitting antenna can comprise multiple directional antennas that are arranged to give an overall 360 degrees of coverage if the antennas are used to transmit simultaneously.

Power supply 212 provides power for the wireless access port 110. In a typical embodiment, power supply 212 can connect to a source of AC power, such as an electrical outlet, to power wireless access port 110. Note that unlike the wired access ports 108, the wireless access ports 110 are provided preferably power via an Ethernet connection. While power supply 212 is illustrated and discussed as a corded power supply, alternative sources of power, such as batteries, can be utilized in accordance with the teachings of the present invention.

After the wireless access ports 110 are installed and provided power, wireless access ports 110 power on and attempt to find a wired access port 108 to communicate with by monitoring transmissions of surrounding wired access ports 108 and selecting, in an exemplary embodiment, the wired access port 108 with the strongest signal. This typically will be the closest wired access port 108. Once the wireless access port 110 determines the best access port with which to communicate, the wireless access port 110 can send a message to the wired access port 108 indicating that the wireless access port 110 is ready to initiate communication. The wired access port 108 that receives the message can then adopt the wireless access port 110 and send the software image needed for operation to the wireless access port 110. The software image can then be executed by the processor 202 of the wireless access port 110.

After the wireless access port 110 is operational, it can send data packets to the wired access port 108. The wired access port 108 can then send the data packets to the wireless switch 104. Since the wireless switch 104 receives all of its data packets from a wired connection 105, the addition of the wireless access ports 110 does not change the operation of the wireless switch 104. Wireless access port 110 can also be adopted by a wireless access port 110 both are part of the wireless local area network 100. For example, upon initialization, one of the wireless access ports 110, the nearby access port that is selected can be a previously installed wireless access port 110.

Figure 3:
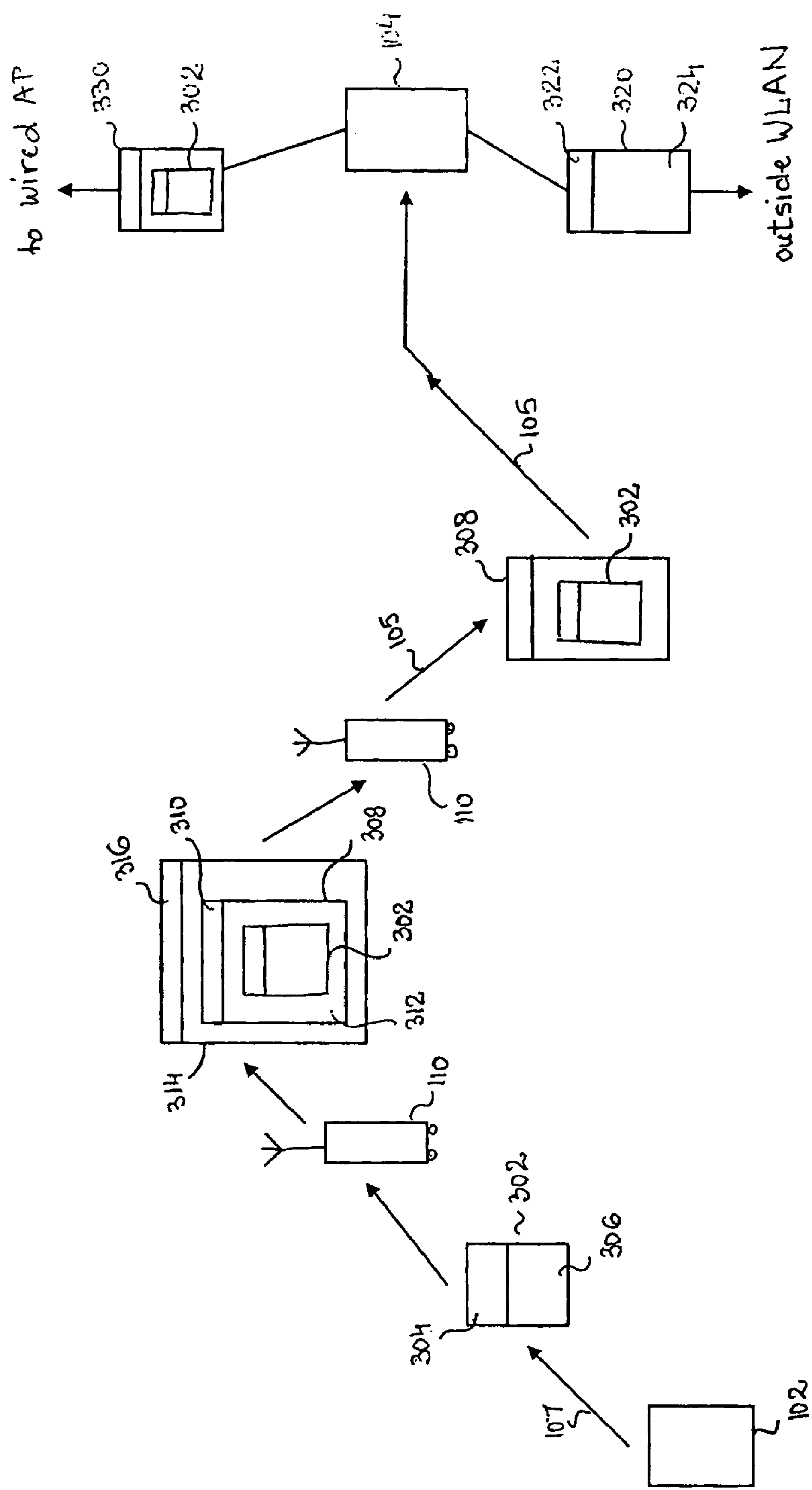
FIG. 3 illustrates a data packet transfer scenario in accordance with an exemplary embodiment of the present invention.

FIG. 3 illustrates a data packet transfer scenario, in accordance with an exemplary embodiment.

In this one exemplary embodiment of the invention, the mobile unit 114 sends first data packets 302, comprising a first header 304 and a first payload 306 over a wireless link 107. The first data packets 302 preferably conform to a wireless data packet protocol, such as an 802.11 protocol or other proprietary or non-proprietary protocol. The wireless access port 110 encapsulates the first data packets 302 to form second data packets 308 that preferably conform to a wired data packet protocol, such as an 802.3 protocol or other proprietary or non-proprietary protocol. The second data packets 308 can include a second header 310 containing information such as the identity of the first data packet 302 and the final destination of the first data packet 302. The first data packets 302 are placed in a second payload 312 of the second data packet 308. Since the wireless access port 110 sends the data packets wirelessly to either another wireless access port 110 or a wired access port 108, the second data packets 308 are further encapsulated to form third data packets 314 that preferably conform to a wireless data packet protocol, such as an 802.3 protocol or other proprietary or non-proprietary protocol. The third data packets 314 can include a third header 316 with the wireless access port 110 listed as the source and a wired access port 108 listed as a destination. The third data packets 314 also include a third payload 318 that can store the second data packet 308.

The wireless access port 110 sends the third data packets 314 over the wireless link 107. The third data packets 314 can be received by wired access port 108. The wired access port 108 first removes the second data packet 308 from third data packet 314. This leaves the first data packets 302 encapsulated in the second data packets 308. Since the second data packet conforms to a wired data packet protocol, second data packets 308 can be sent to the wireless switch 104 over the wired connection 105.

When received by the wireless switch 104, if the data in the first data packet 302 is to be delivered outside of the wireless local area network 100, the data in the first payload 306 of the first data packets 302 are removed from the first data packets 302 and the second data packets 308. The data is repackaged in a fourth payload 324 of fourth data packets 320, the fourth data packet 320 conforming to a wired data protocol. A fourth header 322 of the fourth data packet 320 can include the original source of the first packet 302 and the original destination of the first data packet 302. If the destination of the packet is to a location within the wireless local area network 100, the first data packets 302 are removed from the second data packets 308 and then encapsulated into fifth data packets 330. The fifth data packets 330 conform to a wired data packet protocol because the fifth data packets are sent from the wireless switch 104 to a wired access port 108 via the wired connection 105.

Figure 4:
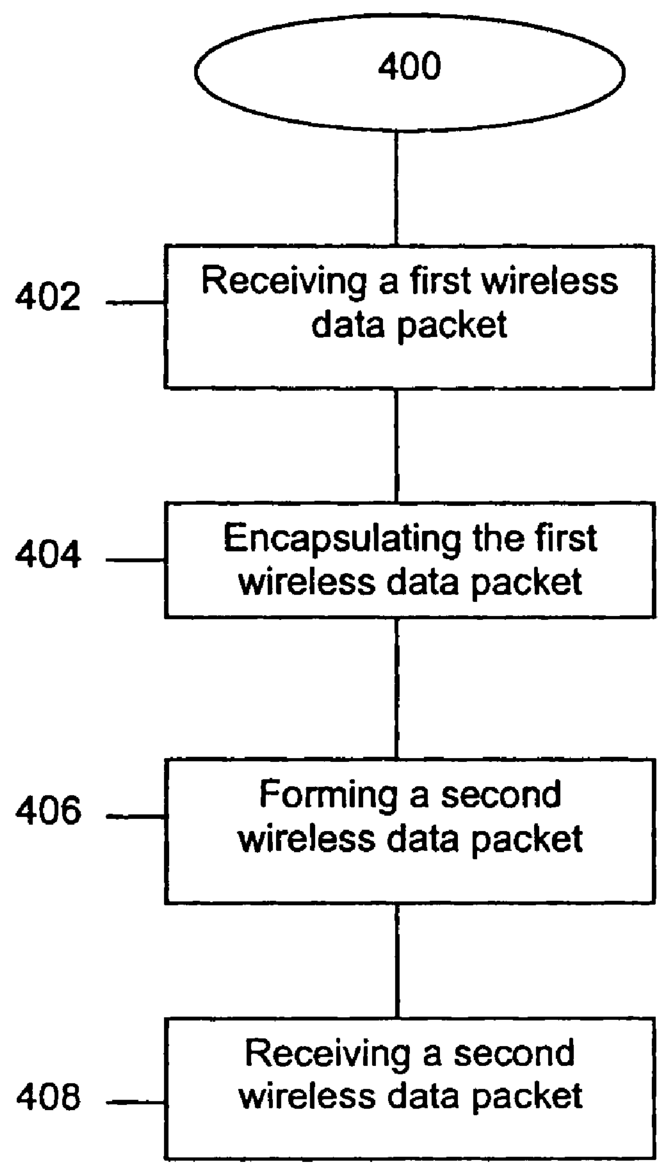
FIG. 4 is a flowchart that illustrates a method in accordance with the preset invention.

FIG. 4 is a flowchart that illustrates a method in accordance with the preset invention.

Method 400 illustrated in FIG. 4 is a method for transmitting wireless data packets to a wireless switch. Method 400 comprises a plurality of steps, such as step 402 of receiving a first wireless data packet, step 404 forming a first wired data packet by encapsulating the first wireless data packet, and step 406 forming a second wireless data packet by encapsulating the first wired data packet, and the second wireless data packet for transmission between a wireless access port and the wired access port. The method 400 further comprises receiving a second wireless data packet at a wired switch, stripping the first wired data packet from the second wireless data packet and sending the first wired data packet from a wired access port to a wireless switch.

Figure 5:
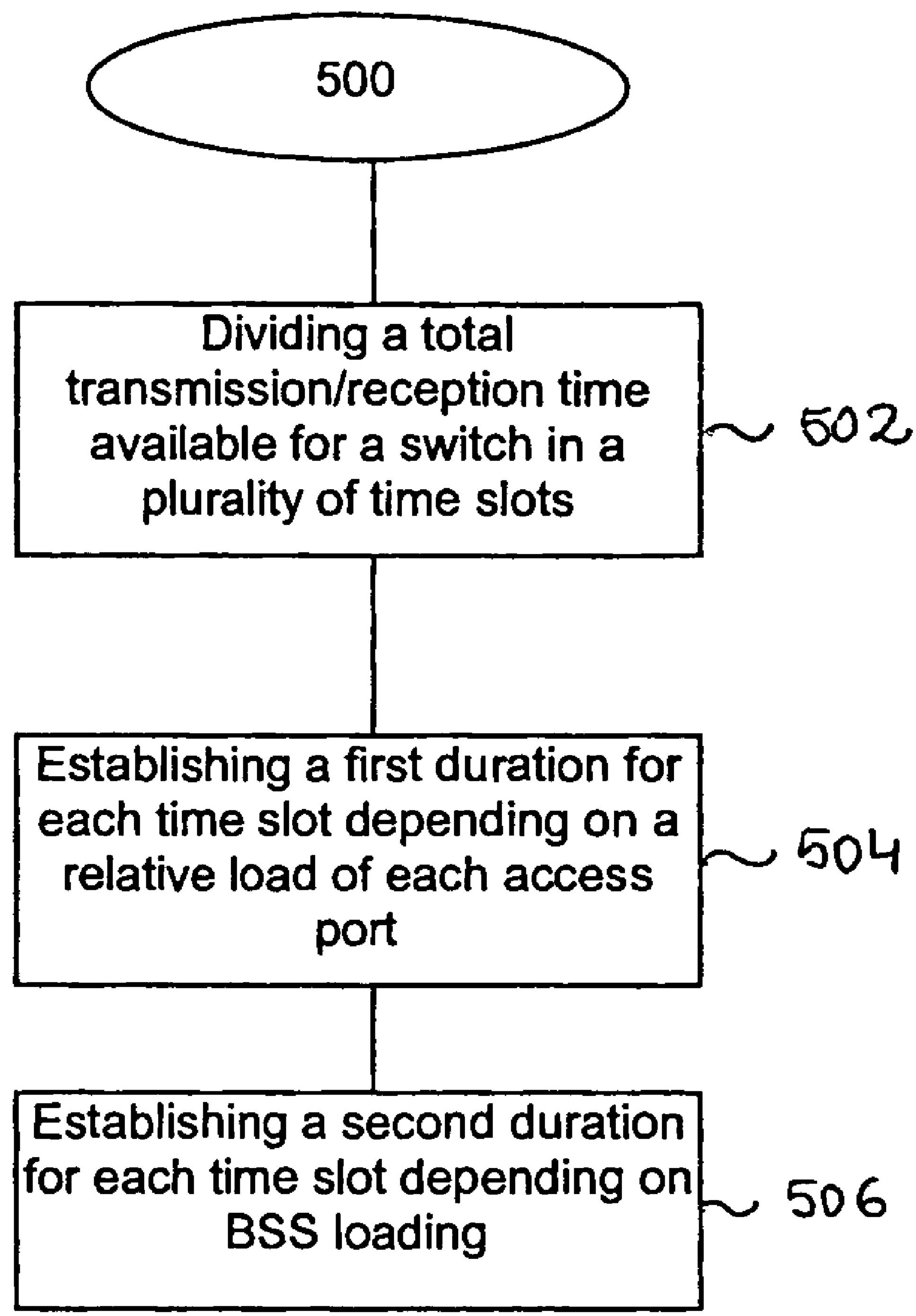
FIG. 5 is another flowchart that illustrates another method in accordance with the preset invention.

FIG. 5 is another flowchart that illustrates another method in accordance with the preset invention.

Method 500 illustrated in FIG. 5 is a method of reserving time slots across access ports in a wireless network. The method 500 comprises a plurality of steps, such as step 502 of dividing the total time available for a switch in a plurality of time slots. The division renders at least one of the plurality of slots to be allotted for broadcast; at least one of the plurality of slots to be allotted for inter-AP communication; and at least one of the plurality of slots to be allotted for local BSS traffic. Method 500 also comprises step 504 of establishing a first duration of each of time slot depending on a relative load of each access port, and step 506 of establishing a second duration of each time slot depending on BSS loading. The switch controls the plurality of slots and the first and second durations. The division is performed depending on a number of neighboring access ports for the switch.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A communication system, comprising:

a wireless switch;

a plurality of wired access ports coupled to said wireless switch via a wired connection and configured to receive data over said wired connection and over a wireless connection; and a plurality of wireless access ports configured to receive data over said wireless connection from the wireless access port and to send data over the wireless connection to the wired access port, the wireless access port further configured to receive and encapsulate first wireless data packets in to first wired data packets based on a wired transmission protocol and encapsulate said first wired data packets into second wireless data packets based on a wireless transmission protocol.

2. The system of claim 1, wherein said wireless transmission protocol is an 802.11 protocol and said wired transmission protocol is an Ethernet protocol.

3. The system of claim 1, wherein said wired access ports are configured to receive said second wireless data packets and remove said first wired data packets for transmission over said wired connection.

4. The system of claim 3, wherein said wireless switch is configured to receive the first wired data packets, extract the first wireless data packets, and place a payload of first data packets into second wired packets for transmission outside the communication system.

5. The system of claim 4, wherein said wireless switch is configured to remove the first wired data packets and encapsulate the first wired data packets into third wired data packets for transmission within the communication system, via said plurality of wireless access ports.

6. The method of claim 1, wherein a mobile unit operating in the communication system is configured to directly send data to either said plurality of wireless access ports or said plurality of wired access ports.

7. The system of claim 1, wherein said plurality of wired access ports download operational software upon boot-up from said wireless switch.

8. The system of claim 7, wherein said plurality of wireless access ports download the operational software from said wired access ports.

9. The system of claim 8, wherein a new wireless access port downloads operational software from one of said plurality of wireless access ports.

10. The system of claim 1, wherein said wired connection is made using an Ethernet protocol.

11. The system of claim 1, wherein a software update can be delivered to each of the plurality of wired access ports and each of the plurality of wireless access ports via the wireless switch.

12. The system of claim 1, wherein each of the plurality of wireless access ports can be added to the communication system without performing a survey of the site where the communication system is located.

13. The system of claim 1, wherein the wireless switch is a gateway to an external computer network.

14. An access port for use in a wireless local area network, comprising:

an antenna coupled to the wireless receiver;

a wireless receiver coupled to the antenna and configured to receive data packets sent over a wireless link;

a wireless transmitter coupled to the antenna and configured to transmit data packets over the wireless link; and a processor coupled to the wireless receiver and wireless transmitter, the processor configured to:

encapsulate a first wireless data packet received by the wireless receiver into a first wired data packet using a wired data protocol; and encapsulate the first wired data packet into a second wireless data protocol for transmission over the wireless link.

15. The access port of claim 14, wherein the processor is further configured to:

utilize the wireless receiver to recognize a second access port that is already part of the network;

send an initialization message to the second access port; and receive a software image to load into memory and execute using the processor.

16. The access port of claim 14, wherein the wireless protocol is an 802.11 protocol.

17. The access port of claim 14, wherein the wireless transmitter sends data to a wireless switch via a wired access port connected to the wireless switch with a wired connection.

18. The access port of claim 14, wherein the antenna comprises a receiver antenna coupled to the wireless receiver and a transmit antenna coupled to the wireless transmitter.

* * * * *